(12) United States Patent
Kuhl (10) Patent No.: US 9,073,593 B1
(45) Date of Patent: Jul. 7, 2015

(54) ADJUSTABLE PNEUMATIC BICYCLE SADDLE SYSTEM

(76) Inventor: Steven D. Kuhl, Tomah, WI (US)

( * ) Notice: Subject to any disclaimer, the term of this patent is extended or adjusted under 35 U.S.C. 154(b) by 363 days.

(21) Appl. No.: 13/588,515

(22) Filed: Aug. 17, 2012

Related U.S. Application Data (60) Provisional application No. 61/575,215, filed on Aug. 18, 2011.

(51) Int. Cl.
*B62J 1/26* (2006.01)

(52) U.S. Cl.
CPC .......................................... *B62J 1/26* (2013.01)

(58) Field of Classification Search
CPC .......................................................... B62J 1/26
USPC .................... 297/199, 200, 452.41, 452.42
See application file for complete search history.

(56) References Cited

U.S. PATENT DOCUMENTS

| | | | | |
|---|---|---|---|---|
| 583,209 | A | * | 5/1897 | Cleland ........................ 297/199 |
| 630,266 | A | * | 8/1899 | Perry ............................ 297/199 |
| 718,850 | A | * | 1/1903 | Kruseman .................... 297/199 |
| 1,625,582 | A | | 4/1927 | Anderson |
| 2,558,389 | A | | 6/1951 | Robinson |
| 3,844,611 | A | * | 10/1974 | Young ........................... 297/214 |
| 4,504,089 | A | * | 3/1985 | Calvert et al. ................. 297/214 |
| 4,945,571 | A | * | 8/1990 | Calvert ............................ 2/467 |
| 5,074,618 | A | * | 12/1991 | Ballard ......................... 297/199 |
| 5,280,993 | A | | 1/1994 | Hsh |
| 5,318,344 | A | * | 6/1994 | Wang ............................ 297/199 |
| 5,330,249 | A | | 7/1994 | Weber et al. |
| 5,356,205 | A | * | 10/1994 | Calvert et al. ............ 297/452.41 |
| 5,419,612 | A | * | 5/1995 | Rassekhi ....................... 297/200 |
| 5,524,961 | A | | 6/1996 | Howard |
| 5,558,395 | A | | 9/1996 | Huang |
| 5,634,685 | A | | 6/1997 | Herring |
| 5,636,896 | A | | 6/1997 | Howard |
| 5,670,232 | A | | 9/1997 | Bigolin |
| 5,769,488 | A | * | 6/1998 | Daniels et al. ................ 297/199 |
| 5,904,396 | A | | 5/1999 | Yates |
| 5,975,629 | A | | 11/1999 | Lorbiecki |
| 6,012,772 | A | | 1/2000 | Conde et al. |
| 6,039,396 | A | * | 3/2000 | Muser ........................... 297/214 |
| 6,131,994 | A | | 10/2000 | Yates |
| 6,135,550 | A | | 10/2000 | Tucho |
| 6,390,548 | B1 | | 5/2002 | Cole |
| 7,044,542 | B2 | | 5/2006 | Muscat |
| 7,055,900 | B2 | * | 6/2006 | Losio et al. ................ 297/195.1 |
| 7,114,783 | B2 | | 10/2006 | Warren et al. |
| 7,448,676 | B2 | * | 11/2008 | Wyner et al. .................. 297/200 |
| 7,828,378 | B2 | | 11/2010 | Donaghey |
| 2001/0045765 | A1 | | 11/2001 | Nelson |

* cited by examiner

FOREIGN PATENT DOCUMENTS

| | | | | |
|---|---|---|---|---|
| WO | WO 2010064198 A1 | * | 6/2010 | ................ B62J 1/00 |

*Primary Examiner* — Laurie Cranmer
(74) *Attorney, Agent, or Firm* — Brannen Law Office, LLC (57) ABSTRACT

The present invention relates to an adjustable pneumatic bicycle saddle (seat) system, and in particular to a system that can have standard, male and racing configurations. In one embodiment, the seat has a plate with a surface and two openings there through. The plate also has two screw holes. A bladder, shaped similarly to the plate, is also provided. The bladder has two side sections inflatable with a selected amount of air. The two sides are connected with crossovers, which are also inflated. Two webs are provided for receiving screws to connect the bladder to the plate. A depression with a hose fitting is further provided between the two sides. A cover perforated with many holes is further provided. A pump with a plunger, main valve and release valve can be used to inflate and deflate the bladder in real time as the user is riding the cycle.

18 Claims, 12 Drawing Sheets

ADJUSTABLE PNEUMATIC BICYCLE SADDLE SYSTEM

This patent application claims priority on and the benefit of U.S. provisional application 61/575,215 filed Aug. 18, 2011, the entire contents of which are hereby incorporated herein by reference.

BACKGROUND OF THE INVENTION

1. Field of the Invention

The present invention relates to an adjustable pneumatic bicycle saddle (seat) system, and in particular to a system that can have standard, male and racing configurations, and to a system having an adjustable bladder.

2. Description of the Related Art

Bicycling is a widely enjoyed activity, both recreationally and competitively. Most cyclists are concerned with comfort. That is, if a seat were more comfortable, the rider would be more likely to engage in more frequent and longer rides. Many improvements have been made to saddles, or seats, over the years. Some examples include:

U.S. Pat. No. 5,356,205 to Calvert et al. is titled Seat Assembly with a Defined Flexure Region, Venting or Support Nodules. This patent describes a seat assembly having flexure members and ventilation. An elongated aperture is cut into a base plate of the seat assembly and flexure members are formed in a support plate of the assembly which is mounted to the base plate. The flexure members deform into the aperture thus providing a rider with additional comfort due to the flexibility of the seat. A venting hole is provided throughout the seat assembly to aid in rider comfort. A forced air ventilation system forces air to flow throughout the seat assembly, thus giving the rider ample ventilation.

U.S. Pat. No. 5,419,612 to Rassekhi is titled Inflatable Seat Assembly. It describes an inflatable bicycle seat or cover therefor having a plurality of independently inflatable cell assemblies, each of which is made up of one or more inflatable cells. The cell assemblies are connected to a fluid source so that the user can selectively adjust the degree of inflation of each individual cell assembly and, hence, the contour and support of the seat. The cells within each cell assembly are connected by a conduit that restricts fluid flow between cells within the assembly so that the seat will provide firm and stable support even under the forces generated in pedaling. A lightweight fluid source and controller valve are provided to permit selective adjustment of individual cell assemblies so that the contour and support characteristics can be adjusted to suit the individual requirements, from time to time, of the user.

U.S. Pat. No. 5,524,961 to Howard is titled Pneumatic Bicycle Saddle. This patent shows a bicycle saddle having an air-filled bladder. The bladder is a durable plastic film chamber having an easily accessible air pump and release valve that allows the bicyclist to adjust the air pressure to his/her comfort without dismounting and or seeking an air supply. The bladder is fitted into a contoured cavity located in a plastic shell base. The bicyclist's weight is supported by the bladder which maintains its shape due to material selection and thickness plus a supporting base. Additional dimensional stability is provided by spot welds of the bladder material to control expansion. Also, an optional skirt is provided on the bladder to further hold it in position when inflated. A simple push pump at the rear and a release valve button under the nose of the saddle enables the saddle to be adjusted for pressure. Metal rails provide generous fore and aft adjustment and a place to firmly clamp the saddle to the bicycle seat post. The saddle is covered with a soft flexible material and adhered to the plastic base. The few number of parts and the absence of mechanical gadgetry, allow the saddle to be manufactured, assembled, and offered at low cost. U.S. Pat. No. 5,636,896, also to Howard, is a continuation in part of U.S. Pat. No. 5,524,961.

U.S. Pat. No. 5,634,685 to Herring is titled Inflatable/Deflatable Motorcycle Seat Cushion. It describes an inflatable/deflatable cushion system adapted for installation onto a motorcycle seat may be operated either manually or electrically operated. In the latter case, an electrically operated air compressor is supported on the motorcycle and connected in a pneumatic path to an air port on the cushion. An electrical switch in electrical communication with a source of electrical power on the vehicle includes a first position activating the air compressor, causing the cushion to inflate, and a second position causing the cushion to deflate. In the preferred embodiment the cushion is generally U-shaped and attached to the motorcycle seat such that the rounded section of the U is most rearward on the seat with the ends of the U pointing forwardly.

U.S. Pat. No. 6,039,396 to Muser is titled Bicycle Seat and Seat Cover. It shows a seat covering that is made with a planar base of resilient material and a plurality of resilient spaced columns integrally formed with the base. Each column has a wide end adjacent to the base and a free narrow end remote from the base, the columns extending outwardly on one side of the base to define a shock absorbing surface spaced from the base and creating a flow path for ambient air to travel between the columns. The columns are adapted to flex independently from one another and to converge together or diverge from one another in response to the movement or anatomy of a person, so that friction resulting from relative movement between the covering and the person is minimized.

U.S. Pat. No. 6,135,550 to Tucho is titled Bicycle Seat. It describes a bicycle seat that includes a foam seat cushion member having an inflatable edge cushion provided around the back and side edges of an upper cushion surface thereof and a centrally positioned dual lobe inflatable buttocks cushion.

U.S. Pat. No. 6,390,548 to Cole is titled Bicycle Seat with Inflatable Interior. It shows a bicycle seat with inflatable interior including a bicycle seat comprised of a seat portion and a stem portion. The stem portion couples the bicycle seat to a frame of a standard bicycle. The seat portion has an outer layer and a padded inner layer. The padded inner layer has a recess formed in a central portion thereof. An inflatable cushion is disposed within the recess formed in the central portion of the padded inner layer of the bicycle seat. The inflatable cushion has a generally hourglass configuration. The inflatable cushion has an air tube extending outwardly therefrom and extending outwardly of the bicycle seat. A free end of the air tube has a hand pump coupled thereto for selectively pumping air into the cushion.

U.S. Pat. No. 7,448,676 to Wyner et al. is titled Dynamic Seat with Inflatable Bladder. It shows a bicycle seat for a rider that includes a base having a base top surface with an inflatable bladder having a bladder top surface. The inflatable bladder is disposed on the base top surface and the base top surface and the bladder top surface together form a seat contour profile. A pump is connected to the inflatable bladder to introduce fluid media therein with a release valve fluidly connected to the bladder to permit fluid media to exit therefrom. Also, the bicycle seat of the present invention can be configured to be in the form of a cover to be retrofitted to an existing bicycle seat. In this configuration, the cover includes a base with a structure for securing it to the existing bicycle seat. For example, this structure can be a skirt of material or other releasable type of structure.

Each of these patents show products that may work well for their intended purposes. However, solve the problems of the present invention.

None show a bladder with crossover portions that allow air to pass between two side sections and that prevent buckling of the sides.

None show a seat or saddle with forced air flow between a bladder and a cover.

None show a combination pump with a plunger, a release and a shut-off valve.

None show a male specific seat designed to reduce and/or eliminate pressure on the male genital areas.

Thus there exists a need for an adjustable pneumatic bicycle saddle system that solves these and other problems.

SUMMARY OF THE INVENTION

The present invention relates to an adjustable pneumatic bicycle saddle (seat) system, and in particular to a system that can have standard, male and racing configurations. In one embodiment, the seat has a plate with a surface and two openings there through. The plate also has two screw holes. A bladder, shaped similarly to the plate, is also provided. The bladder has two side sections inflatable with a selected amount of air. The two sides are connected with crossovers, which are also inflated. Two webs are provided for receiving screws to connect the bladder to the plate. A depression with a hose fitting is further provided between the two sides. A cover perforated with many holes is further provided. A pump with a plunger, main valve and release valve can be used to inflate and deflate the bladder in real time as the user is riding the cycle.

According to one advantage of the present invention, the bladder of the standard design has two crossovers. Crossovers advantageously allow air to pass between two side sections and that prevent buckling of the sides.

According to another advantage of the present invention, the seat draws air up through the openings in the plate and bladder. The air can exit through the perforations in the seat. This advantageously allows the rider to keep cool and dry. This effect is enhanced by the present design of having a relatively flat cover and rounded bladder. Each successive pedal by the user causes the air to shift within the bladder as one side deforms and the other side expands.

According to a still further advantage of the present invention, a pump with a plunger, a release valve and a shut-off valve is provided. The shut-off valve advantageously is a rigid valve that prevents bleeding of the air from the bladder by eliminating reliance on a check valve.

According to an advantage of one embodiment of the present invention, a male specific seat design is provided to reduce and/or eliminate pressure on the male genital areas. This is accomplished with the elimination of the front crossover.

According to an advantage of a different embodiment of the present invention, the bladder top is raised slightly to form a hump near the front crossover. This provides a slight saddle effect.

According to a still further advantage of the present invention, the pressure within the saddle is adjustable in real time. This is accomplished with a pump that is easily mounted to a selected portion of a bicycle frame.

Other advantages, benefits, and features of the present invention will become apparent to those skilled in the art upon reading the detailed description of the invention and studying the drawings.

DETAILED DESCRIPTION OF THE PREFERRED EMBODIMENTS

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

Figure 27:
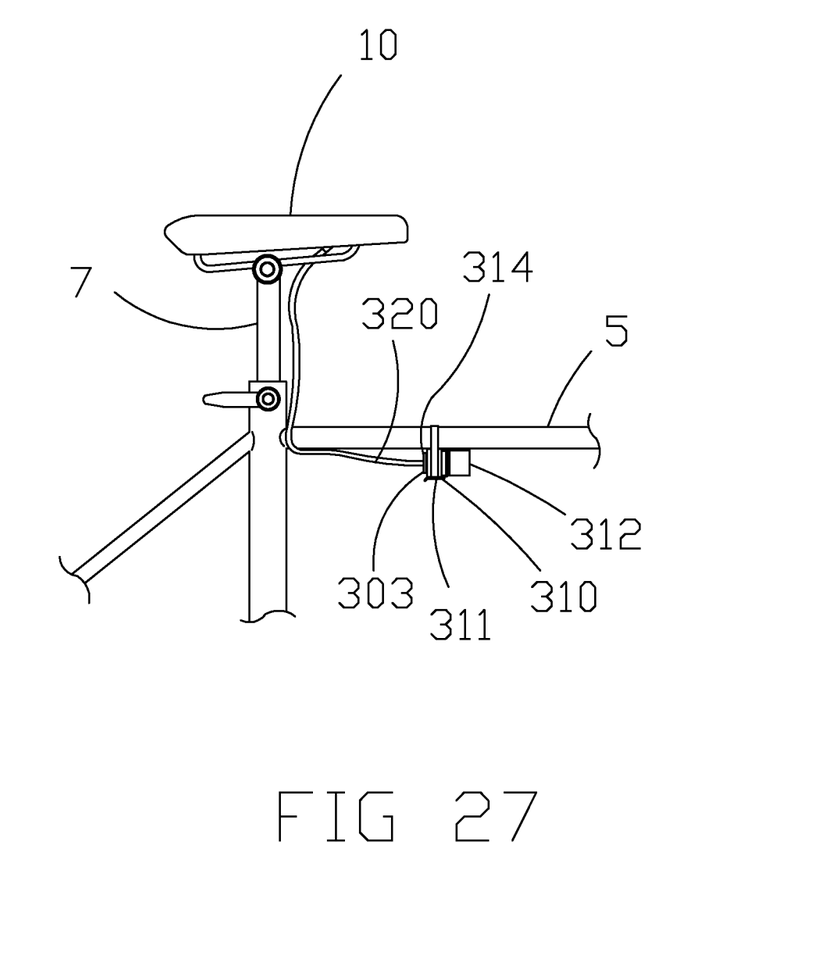
FIG. 27 is a partial side view of a bicycle showing the seat fixed to a seat post and the pump mounted on the bicycle frame at a selected position.

The present invention may be used with a bicycle having a frame 5 and a post 7. The seat of the present invention can be connected to the post in any suitable manner, and the pump can be connected to the frame or elsewhere on the bike. For example, the pump could be mounted under the seat or on the handle bars (or elsewhere) without departing from the broad aspects of the present invention. It is appreciated that while the many illustrated embodiments of the present invention are illustrated with respect to a bicycle, that the present invention could nevertheless be used with other structures without departing from the broad aspects of the present invention.

Turning now to FIGS. 1-9A, it is seen that a first preferred embodiment of the present invention is illustrated. The saddle, or seat, 10 has a top 11, a bottom 12, a front 13, a back 14 and two sides 15 and 16, respectively. The seat 10 has a seat longitudinal axis 17. The seat 10 has a plate 20, a bladder 40 and a cover 90. Each of these components is described in detail below.

Figure 2:
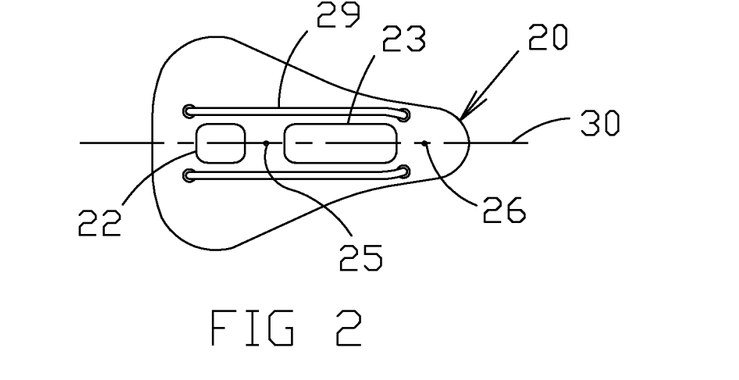
FIG. 2 is a bottom view of a preferred embodiment of a plate of the present invention.
Figure 3:
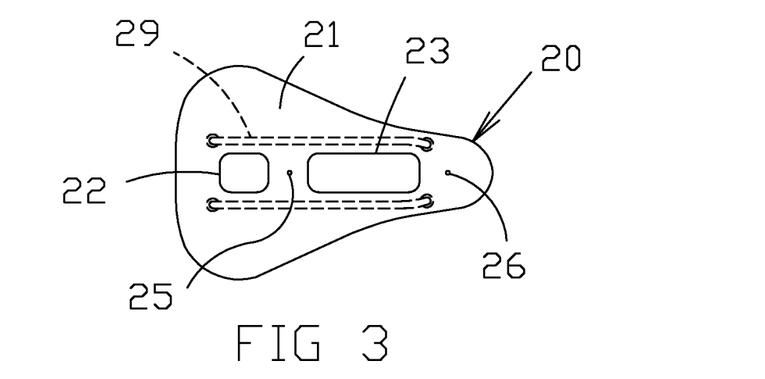
FIG. 3 is a top view of the plate illustrated in FIG. 2.
Figure 4:
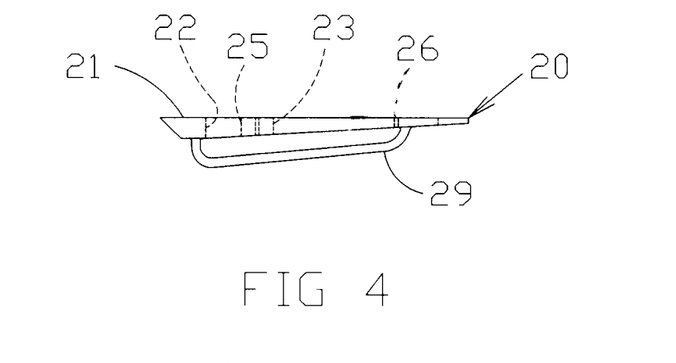
FIG. 4 is a side view of the plate illustrated in FIG. 2.

The plate 20 is preferably made of a suitably strong and rigid material. For example, the plate may be made of plastic or metal. Yet, it is appreciated that other materials may be used without departing from the broad aspects of the present invention.

The plate 20 has a top surface 21 and an opposed bottom surface. The plate further has two openings 22 and 23, respectively that pass through the plate 20. The openings are preferably centrally aligned and symmetrical about a plate longitudinal axis 30. Plate longitudinal axis is preferably parallel to the seat longitudinal axis 17. Two screw holes 25 and 26 are further provided. The screw holes are preferably located along the plate longitudinal axis. In this regard, the screw holes 25 and 26 define two points along the plate longitudinal axis. Mounting rails 29 are provided on the bottom or underside of the plate 20. Rails 29 are used to mount the seat 10 to a post.

Figure 5:
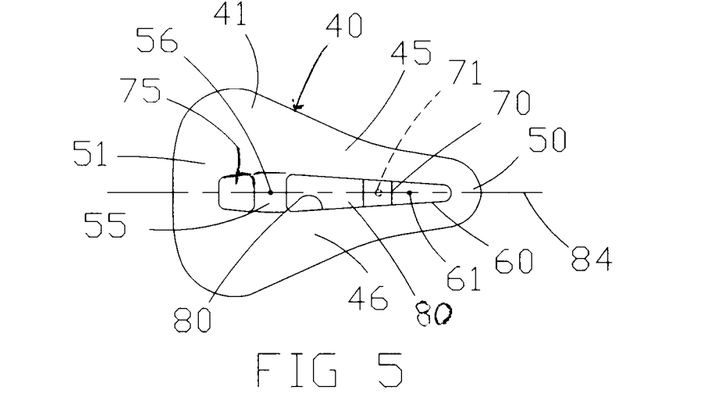
FIG. 5 is a top view of a preferred embodiment of a bladder of the present invention.
Figure 6:
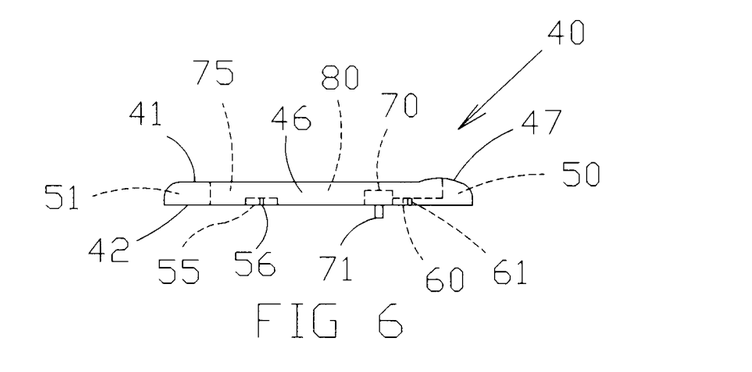
FIG. 6 is a side view of the bladder illustrated in FIG. 5.
Figure 7:
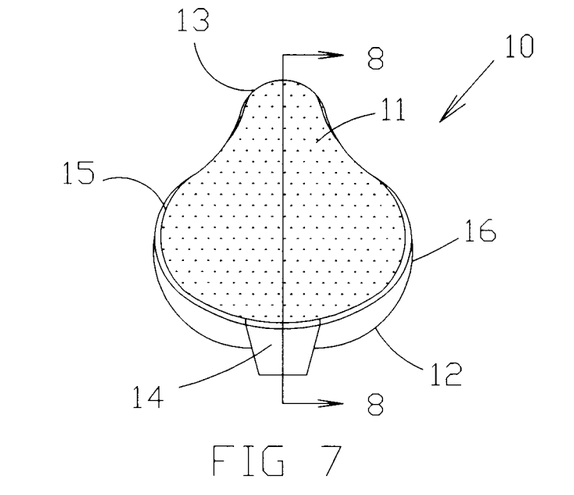
FIG. 7 is a rear elevation view of the preferred seat embodiment illustrated in FIG. 1.

The bladder 40 is preferably made of a strong yet flexible material. Two possible materials are rubber and plastic. Yet, any suitable material could be used without departing from the broad aspects of the present invention.

The bladder 40 has a top 41 and a bottom 42. The bladder 40 further has a first side section 45 and a second side section 46. The first and second side sections are preferably mirror images of each other about a bladder central axis. The bladder central axis is preferably parallel with the plate longitudinal axis and the seat longitudinal axis 17. A front crossover 50 and a back crossover 51 interconnect the sides 45 and 46. The crossovers can be inflated and deflated as the sides are inflated and deflated. The sides and crossovers have the same internal air pressure. A raised portion or hump 47 can be provided on the bladder top 41 adjacent or at and preferably includes the front crossover. The hump 47 is formed by a slight upwards taper to provide a saddled effect on the seat 10.

A web 55 is provided. The web 55 is preferably solid (not inflatable) and spans between the sides 45 and 46. A screw hole 56 is provided for receiving a screw. The screw passes through hole 56 and is received within hole 25 in plate 20.

A web 60 is further provided. The web 60 is similar in thickness as web 55, and also interconnected sides 45 and 46. Web 60 has a screw hole 61 for receiving a screw. The screw passes through hole 61 and is received within hole 26 of the plate 20.

Hence, it is seen that screws are used to connect the bladder 40 to the plate 20 via screw holes.

A depression 70 is further provided. The depression 70 is preferably approximately ¾ as thick as the sides of the bladder. The depression 70 has a hose fitting 71 that preferably depends below the bladder 20. The fitting 71 may be barbed, threaded, designed in another suitable manner for removably being connected to an air line of a pump. Depression 70 does not create a pressure point on the user as it is not as tall as the sides. Yet, it is appreciated that the depression does have sufficient volume to receive the fitting and disperse into or evacuate air from the bladder 40.

A pass 75 or opening is through the bladder 20 between sides 45 and 46. Pass 75 is located between the back crossover 51 and web 55.

A second pass 80 is also provide and passes through the bladder 20 between sides 45 and 46. Pass 80 is located between web 55 and depression 70.

As seen best in FIGS. 5 and 6, from left to right, the bladder 40 along its longitudinal axis has a rear crossover 51, a first pass 75, a web 55, a second pass 80, a depression 70, a web 60 and the front crossover 50. The passes, webs and depression form a valley 85 along the longitudinal axis 84 between the crossovers 50 and 51 that relieve pressure from the sensitive parts of a rider's anatomy.

Pass 75 is similar in size and shape as opening 22 in plate 20.

Pass 80 and depression 70 in combined shape is similar to the size and shape of opening 23 in plate 20. In this regard, the fitting 71 of the depression 70 extends into and partially or entirely through opening 23.

Figure 1:
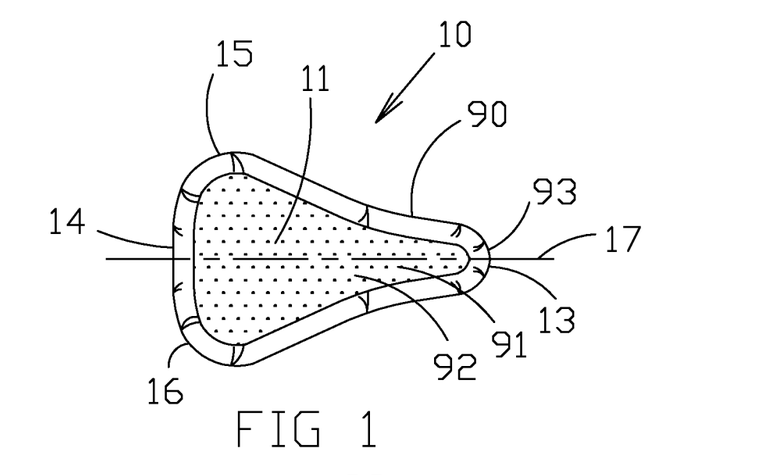
FIG. 1 is a top view of a preferred seat embodiment of the present invention.
Figure 8:
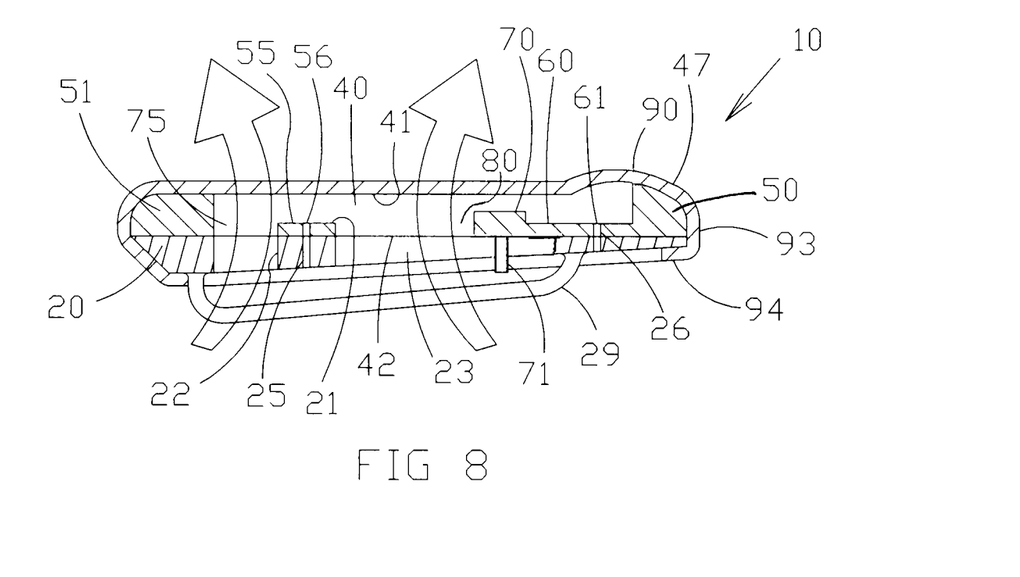
FIG. 8 is a cross-sectional view taken along line 8-8 in FIG. 7.

A cover 90 is further provided. Cover 90 has a top 91 with holes 92 there through. The holes 92 allow air to pass through the seat cover 90. The cover 90 further has sides 93 and a bottom 94. The bottom extends below the bottom of the plate 20 so that the cover 90 covers and contains the plate 20 and bladder 40.

Figure 9:
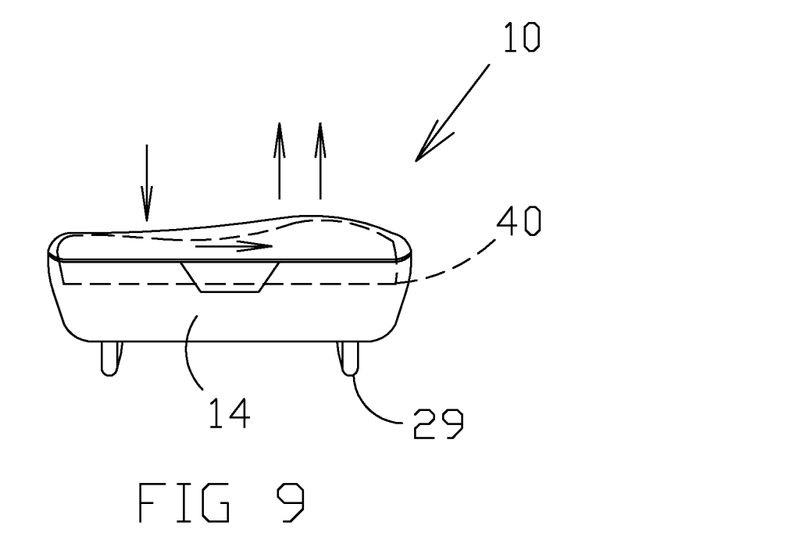
FIG. 9 is a rear view illustrating movement within the bladder in one direction during use of the present invention.
Figure 9A:
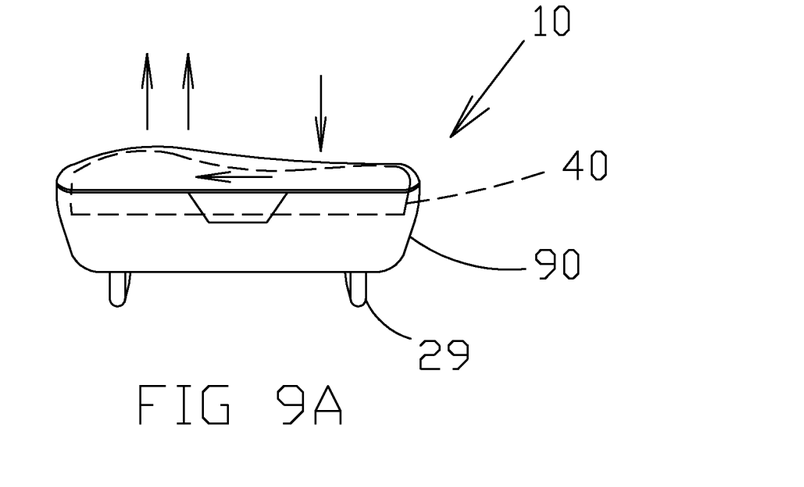
FIG. 9A is similar to FIG. 9, but illustrates movement in the opposite direction.

As seen in FIG. 9, air can flow through the openings 22 and 23 of plate 20 and corresponding passes 75 and 80 of the bladder 40. The air can then pass through the holes 92 in the top 91 of the cover 90. The air flow can occur under normal static conditions. The air flow is also enhanced by the movement of the rider. In this regard, looking at FIGS. 9 and 9A, it is seen that the bladder changes shape during the left/right pedaling of the cyclist. Air evacuating from a bladder side causes the opposite side to expand. Yet, the cover stays relatively flat during the expansion and collapse of the respective bladder sides. The expanding bladder expels any air between the bladder and cover (on the particular bladder side) and that air may exit out the holes 92 in the cover. When that excess volume is released (opposite pedal), voids, gaps or partial separations can form between the bladder and the cover. These air gaps can be fed through the openings in the plate and bladder.

Turning now to FIGS. 10-17, it is seen that a second preferred embodiment of the present invention is illustrated. The saddle, or seat, 110 has a top 111, a bottom 112, a front 113, a back 114 and two sides 115 and 116, respectively. The seat 110 has a seat longitudinal axis 117. The seat 110 has a plate 120, a bladder 140 and a cover 190. Each of these components is described in detail below. Seat 110 is a male specific design that is intended to alleviate pressure from the male anatomy.

Figure 11:
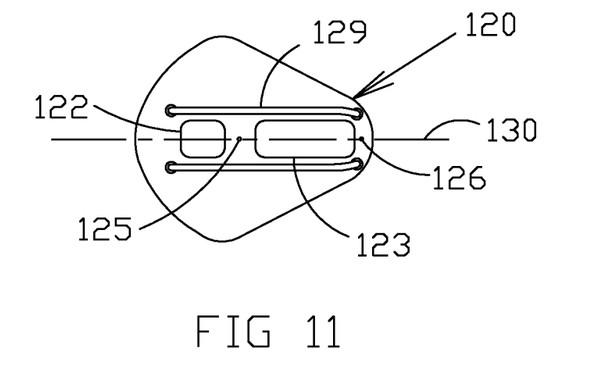
FIG. 11 is a bottom view of an alternative preferred embodiment of a plate of the present invention.
Figure 12:
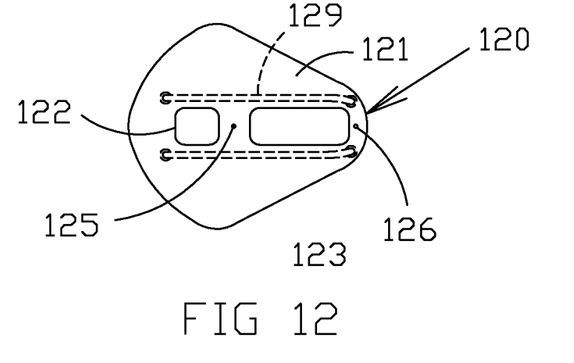
FIG. 12 is a top view of the plate illustrated in FIG. 11.
Figure 13:
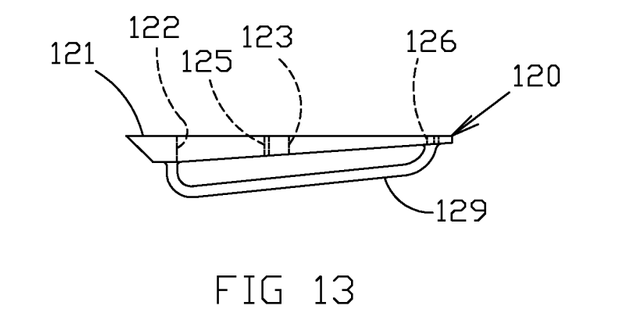
FIG. 13 is a side view of the plate illustrated in FIG. 11.

The plate 120 is preferably made of a suitably strong and rigid material. For example, the plate may be made of plastic or metal. Yet, it is appreciated that other materials may be used without departing from the broad aspects of the present invention.

The plate 120 has a top surface 121 and an opposed bottom surface. The plate further has two openings 122 and 123, respectively that pass through the plate 120. The openings are preferably centrally aligned and symmetrical about a plate longitudinal axis 130. Plate longitudinal axis is preferably parallel to the seat longitudinal axis 117. Two screw holes 125 and 126 are further provided. The screw holes are preferably located along the plate longitudinal axis. In this regard, the screw holes 125 and 126 define two points along the plate longitudinal axis. Mounting rails 129 are provided on the bottom or underside of the plate 120. Rails 129 are used to mount the seat 110 to a post.

Figure 14:
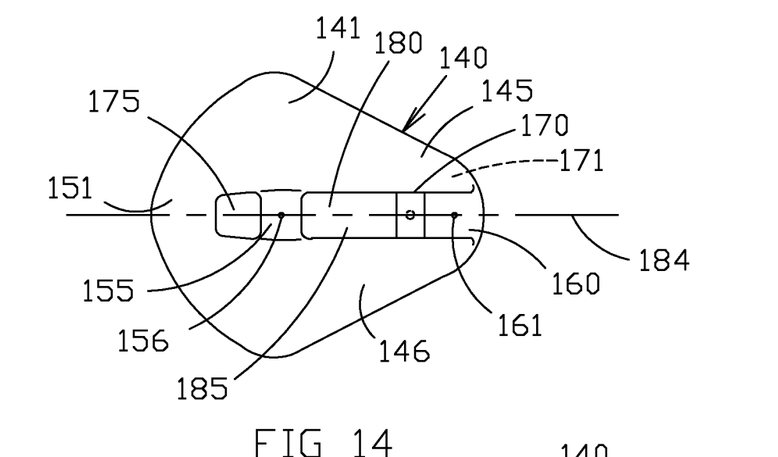
FIG. 14 is a top view of an alternative preferred embodiment of a bladder of the present invention.
Figure 15:
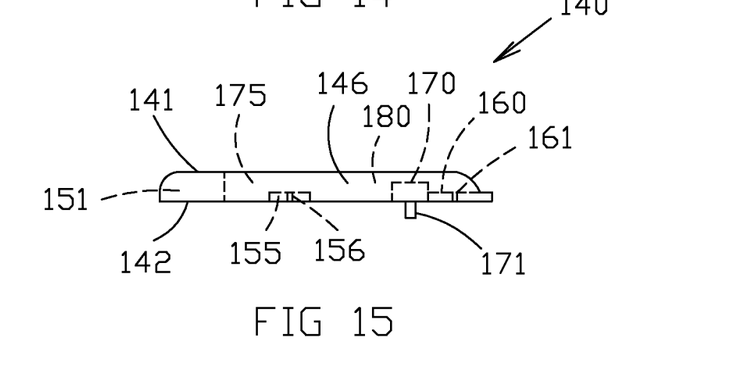
FIG. 15 is a side view of the bladder illustrated in FIG. 14.
Figure 16:
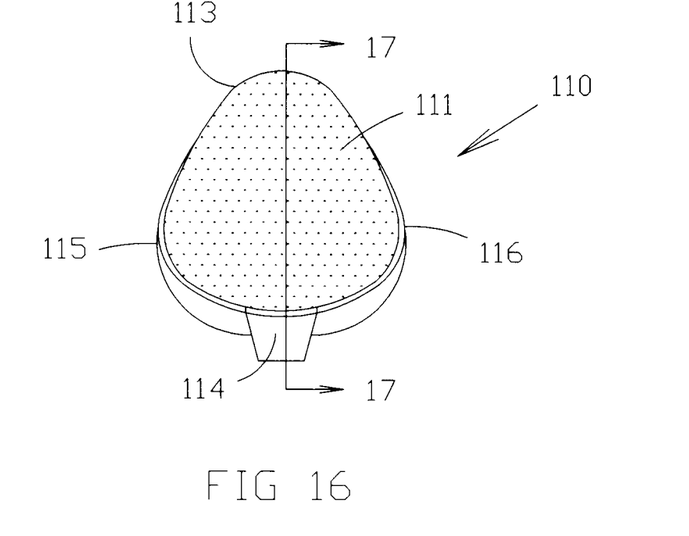
FIG. 16 is a rear elevation view of the preferred seat embodiment illustrated in FIG. 10.

The bladder 140 is preferably made of a strong yet flexible material. Two possible materials are rubber and plastic. Yet, any suitable material could be used without departing from the broad aspects of the present invention.

The bladder 140 has a top 141 and a bottom 142. The bladder 140 further has a first side section 145 and a second side section 146. The first and second side sections are preferably mirror images of each other about a bladder central axis 184. The bladder central axis is preferably parallel with the plate longitudinal axis 130 and the seat longitudinal axis 117. A back crossover 151 interconnects the sides 145 and 146. The crossover 151 can be inflated and deflated as the sides are inflated and deflated. The sides 145 and 146 and crossover 151 have the same internal air pressure.

A web 155 is provided. The web 155 is preferably solid (not inflatable) and spans between the sides 145 and 146. A screw hole 156 is provided for receiving a screw. The screw passes through hole 156 and is received within hole 125 in plate 120.

A web 160 is further provided. The web 160 is similar in thickness as web 155, and also interconnected sides 145 and 146. Web 160 has a screw hole 161 for receiving a screw. The screw passes through hole 161 and is received within hole 126 of the plate 120. Web 160 spans to the front 113 of the seat 110.

Hence, it is seen that screws are used to connect the bladder 140 to the plate 120 via screw holes.

A depression 170 is further provided. The depression 170 is preferably approximately ¾ as thick as the sides of the bladder. The depression 170 has a hose fitting 171 that preferably depends below the bladder 120. The fitting 171 may be barbed, threaded, designed in another suitable manner for removably being connected to an air line of a pump. Air is added to and/or evacuated from the cavity via the depression 170.

A pass 175 or opening is through the bladder 120 between sides 145 and 146. Pass 175 is located between the back crossover 151 and web 155.

A second pass 180 is also provide and passes through the bladder 120 between sides 145 and 146. Pass 180 is located between web 155 and depression 170.

As seen best in FIGS. 14 and 15, from left to right, the bladder 140 along its longitudinal axis 184 has a rear crossover 151, a first pass 175, a web 155, a second pass 180, a depression 170 and web 160. The passes, webs and depression form a valley 185 along the longitudinal axis 184 between the crossover 151 and the seat front 113 that relieve pressure from the sensitive parts of a rider's anatomy. It is seen that the valley 185 is bound on one side by the rear crossover 151 and is unbound at the seat front.

Pass 175 is similar in size and shape as opening 122 in plate 120.

Pass 180 and depression 170 in combined shape is similar to the size and shape of opening 123 in plate 120. In this regard, the fitting 171 of the depression 170 extends through opening 123.

Figure 10:
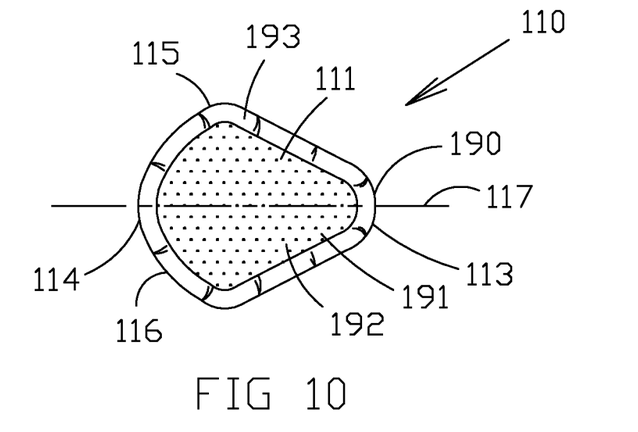
FIG. 10 is a top view of an alternative preferred seat embodiment of the present invention.
Figure 17:
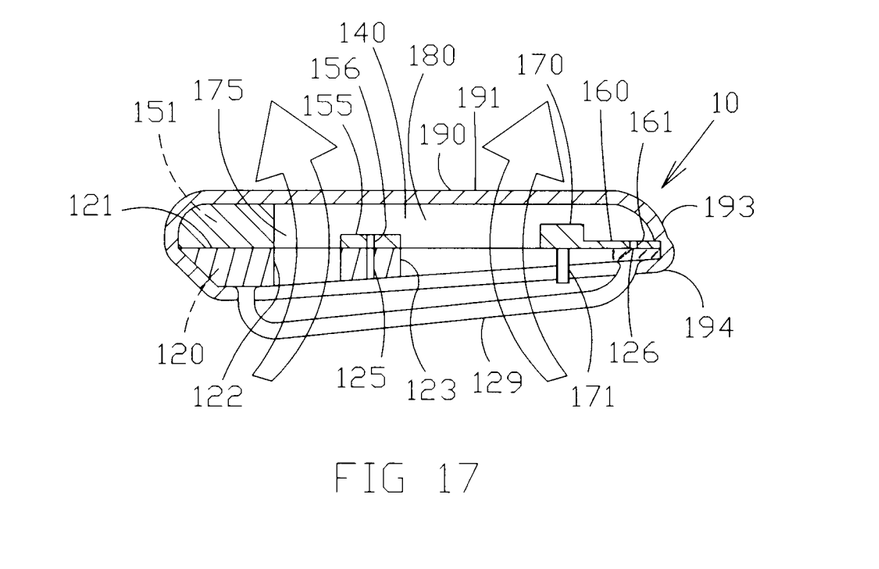
FIG. 17 is a cross-sectional view taken along line 17-17 in FIG. 16.

A cover 190 is further provided. Cover 190 has a top 191 with holes 192 there through. The holes 192 allow air to pass through the seat cover 190. The cover 190 further has sides 193 and a bottom 194. The bottom extends below the bottom of the plate 120 so that the cover 190 covers and contains the plate 120 and bladder 140.

Turning now to FIGS. 18-25, it is seen that a third preferred embodiment of the present invention is illustrated. The saddle, or seat, 210 has a top 211, a bottom 212, a front 213, a back 214 and two sides 215 and 216, respectively. The seat 210 has a seat longitudinal axis 217. The seat 210 has a plate 220, a bladder 240 and a cover 290. Each of these components is described in detail below. Seat 210 is a racing specific design.

Figure 19:
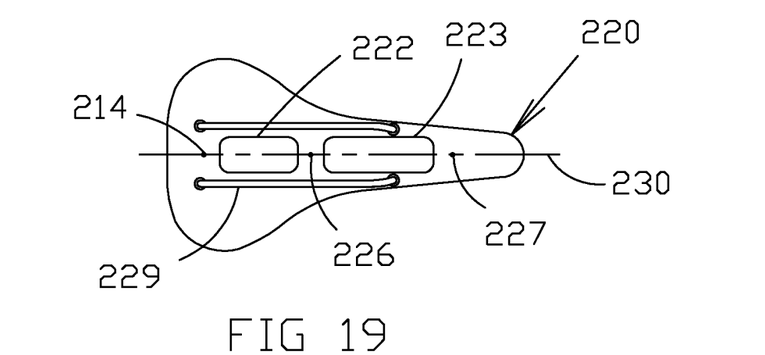
FIG. 19 is a bottom view of an additional alternative preferred embodiment of a plate of the present invention.
Figure 20:
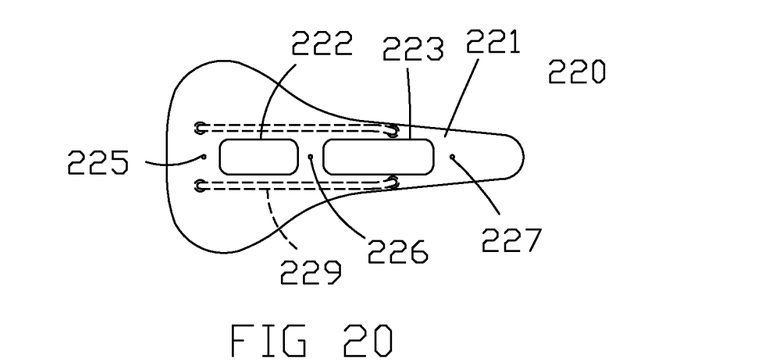
FIG. 20 is a top view of the plate illustrated in FIG. 19.
Figure 21:
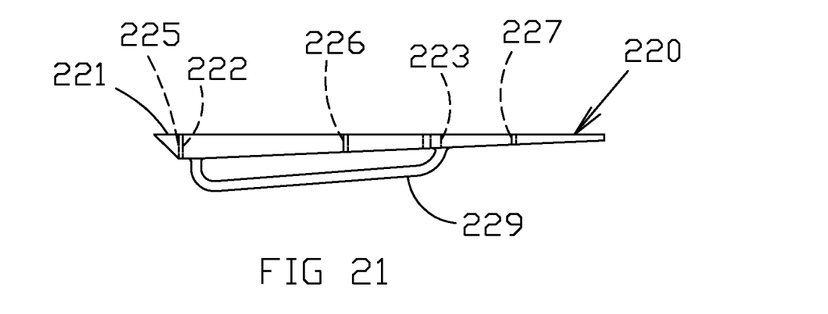
FIG. 21 is a side view of the plate illustrated in FIG. 19.

The plate 220 is preferably made of a suitably strong and rigid material. For example, the plate may be made of plastic or metal. Yet, it is appreciated that other materials may be used without departing from the broad aspects of the present invention.

The plate 220 has a top surface 221 and an opposed bottom surface. The plate further has two openings 222 and 223, respectively that pass through the plate 220. The openings are preferably centrally aligned and symmetrical about a plate longitudinal axis 230. Plate longitudinal axis is preferably parallel to the seat longitudinal axis 217. Three screw holes 225, 226 and 227 are further provided. The screw holes are preferably located along the plate longitudinal axis 230. In this regard, the screw holes 225, 226 and 227 define three points along the plate longitudinal axis. Mounting rails 229 are provided on the bottom or underside of the plate 220. Rails 229 are used to mount the seat 210 to a post.

Figure 22:
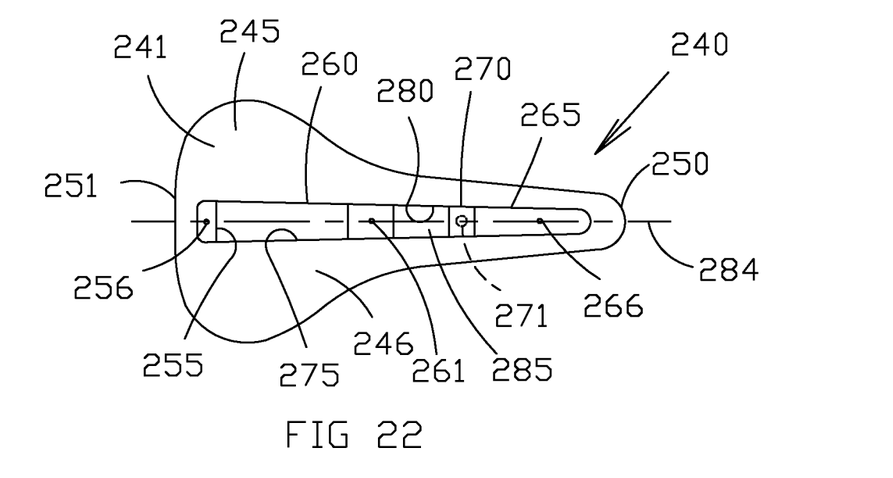
FIG. 22 is a top view of an additional alternative preferred embodiment of a bladder of the present invention.
Figure 23:
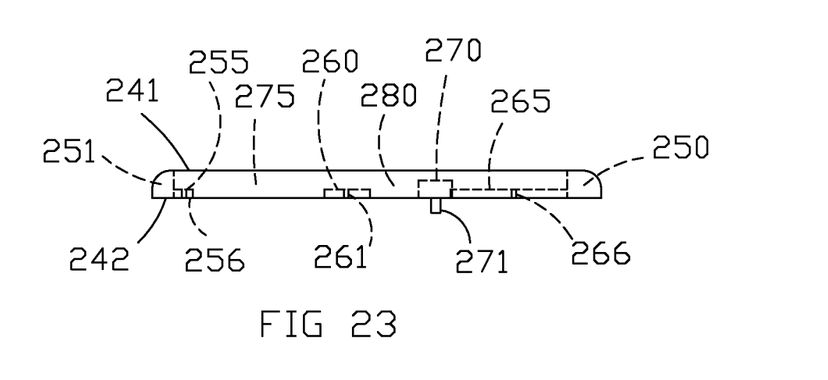
FIG. 23 is a side view of the bladder illustrated in FIG. 22.
Figure 24:
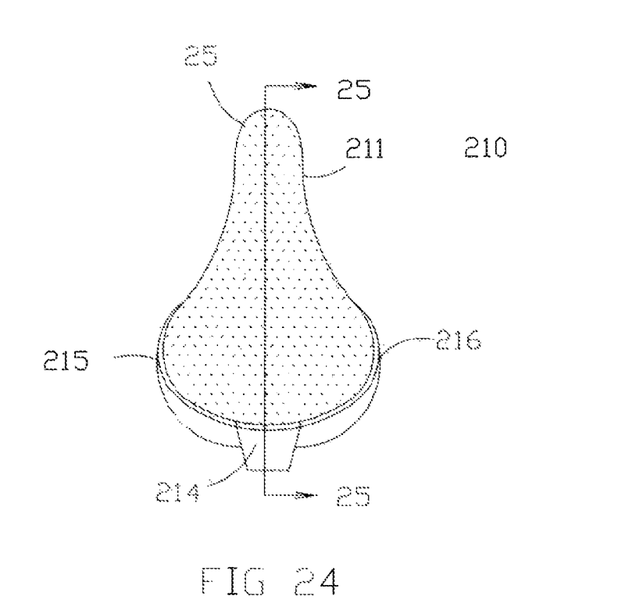
FIG. 24 is a rear elevation view of the preferred seat embodiment illustrated in FIG. 18.

The bladder 240 is preferably made of a strong yet flexible material. Two possible materials are rubber and plastic. Yet, any suitable material could be used without departing from the broad aspects of the present invention.

The bladder 240 has a top 241 and a bottom 242. The bladder 240 further has a first side section 245 and a second side section 246. The first and second side sections are preferably mirror images of each other about a bladder central axis 284. The bladder central axis is preferably parallel with the plate longitudinal axis 230 and the seat longitudinal axis 217. A front crossover 250 and a back crossover 251 interconnect the sides 245 and 246. The crossovers 250 and 251 can be inflated and deflated as the sides are inflated and deflated. The sides 245 and 246 and crossover 251 have the same internal air pressure.

A web 255 is provided. The web 255 is preferably solid (not inflatable) and spans between the sides 245 and 246. A screw hole 256 is provided for receiving a screw. The screw passes through hole 256 and is received within hole 225 in plate 220. Web 255 is located adjacent the rear crossover 251.

A web 260 is further provided. The web 260 is similar in thickness as web 255, and also interconnected sides 245 and 246. Web 260 has a screw hole 261 for receiving a screw. The screw passes through hole 261 and is received within hole 226 of the plate 220.

A web 265 is further provided. The web 265 is similar in thickness as web 255, and also interconnected sides 245 and 246. Web 265 has a screw hole 266 for receiving a screw. The screw passes through hole 266 and is received within hole 227 of the plate 220.

Hence, it is seen that screws are used to connect the bladder 240 to the plate 220 via screw holes.

A depression 270 is further provided. The depression 270 is preferably approximately ¾ as thick as the sides of the bladder. The depression 270 has a hose fitting 271 that preferably depends below the bladder 220. The fitting 271 may be barbed, threaded, designed in another suitable manner for removably being connected to an air line of a pump. Air is added to and/or evacuated from the cavity via the depression 270.

A pass 275 or opening is through the bladder 220 between sides 145 and 246. Pass 275 is located between the web 265 and web 260.

A second pass 280 is also provide and passes through the bladder 220 between sides 245 and 246. Pass 280 is located between web 260 and depression 270.

As seen best in FIGS. 22 and 23, from left to right, the bladder 140 along its longitudinal axis 284 has a rear crossover 251, web 255, a first pass 275, a web 26, a second pass 280, a depression 270, web 265 and front crossover 250. The passes, webs and depression form a valley 285 along the longitudinal axis 284 that relieves pressure from the sensitive parts of a rider's anatomy.

Pass 275 is similar in size and shape as opening 222 in plate 220.

Pass 280 and depression 270 in combined shape is similar to the size and shape of opening 223 in plate 220. In this regard, the fitting 271 of the depression 270 extends through opening 223.

Figure 18:
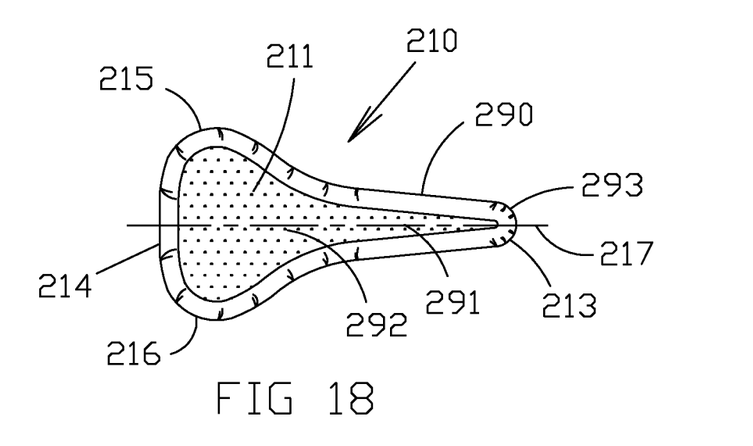
FIG. 18 is a top view of an additional alternative preferred seat embodiment of the present invention.
Figure 25:
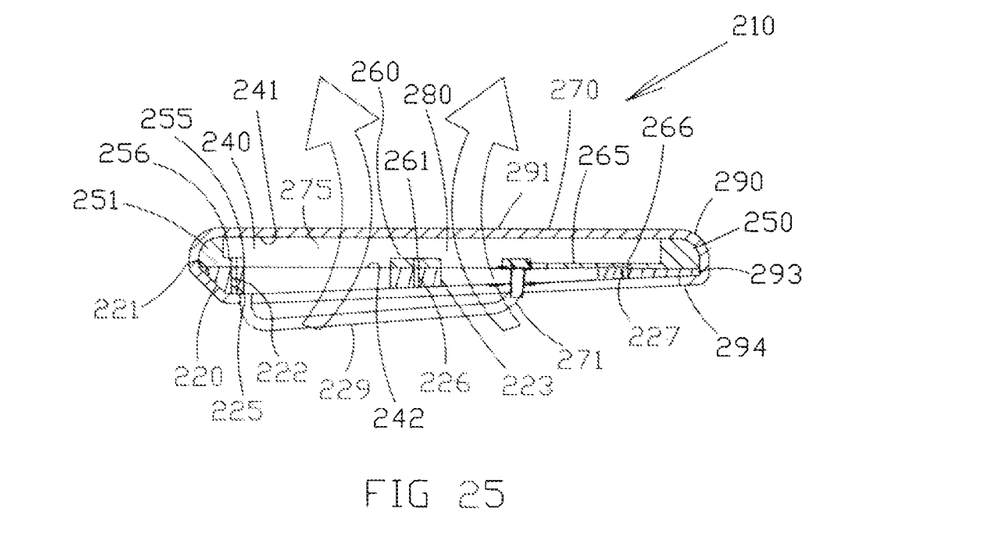
FIG. 25 is a cross-sectional view taken along line 25-25 in FIG. 24.

A cover 290 is further provided. Cover 290 has a top 291 with holes 292 there through. The holes 292 allow air to pass through the seat cover 290. The cover 290 further has sides 293 and a bottom 294. The bottom extends below the bottom of the plate 220 so that the cover 290 covers and contains the plate 220 and bladder 240.

Figure 26:
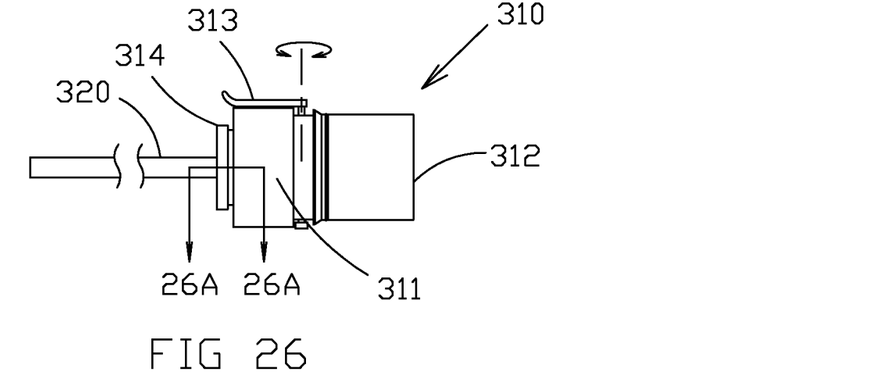
FIG. 26 is a side view of a preferred pump of the present invention.

Turning now to FIGS. 26-27, it is seen that a preferred embodiment of a pump 310 is illustrated. Pump 310 has a body 311, a plunger 312, a main valve 313, a release valve 314 and a pin hole 315.

Figure 26A:
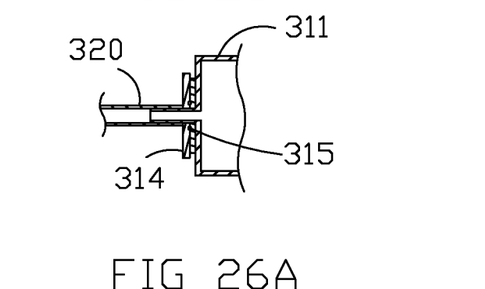
FIG. 26A is a partial cross-sectional view taken along line 26A-26A in FIG. 26.

Plunger 312 is preferably made of a resilient material, wherein it can be depressed to force air to pass through a line 320 to the bladder. Yet, the plunger 312 resiliently returns to form under while drawing in fresh air.

When the bladder is inflated to an intended pressure, a main valve 313 can be rotated to prevent air from bleeding out through an internal check valve.

Figure 26B:
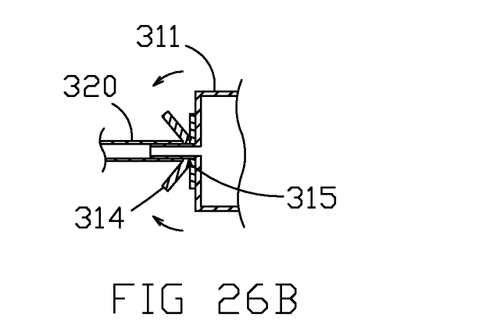
FIG. 26B is similar to FIG. 26A, but shows the release valve placed in an air release position.

The release valve 314 is preferably disk shaped and is biased to have a flat profile. The valve 314 is operated with a finger. When it is in the seal position, it covers a pin hole 315. When it is in the open position, part or all of the valve 314 can be pulled away from the body 311 to expose the pin holes 315 and allow air to escape the system. It is understood that while two sides are shown moved to the release position, that release of bladder air could be accomplished with a single side being pulled away from the body. The release valve 314 is biased towards the seal position wherein the pin holes are sealed.

It is appreciated that other types of seals may be used without departing from the broad aspects of the present invention.

Thus it is apparent that there has been provided, in accordance with the invention, an adjustable pneumatic bicycle saddle system that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A seat comprising:
a seat top;
a seat bottom;
a seat front;
a seat rear;
a seat first side;
a seat second side;
a bladder, said bladder having:
    a bladder first side section and a bladder second side section;
    a crossover at said seat rear, said crossover spanning between said bladder first side section and said bladder second side section;
    a first pass;
    a second pass;
    a seat longitudinal axis; and
    a depression with a fitting depending from said depression; and
a plate, said plate having a plate first hole and a plate second hole and supporting said bladder,
wherein:
    said first pass and said second pass each pass through said bladder,
    said seat is generally symmetrical about said seat longitudinal axis;
    said bladder is selectably inflatable,
    said plate first hole is aligned with said first pass of said bladder; and
    said plate second hole is aligned with said second pass of said bladder and
said fitting of said depression extends into said plate second hole.

2. The seat of claim 1 wherein:
said crossover is a rear crossover; and
said seat further comprises a front cross-over.

3. The seat of claim 1 further comprising a cover, said cover having a cover top with a plurality of cover top holes there through, wherein:
one of said bladder first side section and said bladder second side section is pressed against said cover when the other of said bladder first side section and said bladder second side section forms a partial separation from said cover.

4. A seat comprising:
a plate;
a bladder supported by said plate;
a cover, said cover covering said bladder and said plate;
a line; and
a pump connected to said line, said pump comprising a pump body, a plunger, a main valve and a release valve wherein said release valve is generally disk shaped and covers at least one hole in said pump body thereby retaining air within said bladder and wherein said release valve is biased towards a seal position wherein air is retained by said bladder, yet is movable away from said pump body thereby exposing said at least one hole in said pump body to thereby let air evacuate from said bladder.

5. The seat of claim 4 wherein said bladder comprises a bladder first side and a bladder second side, said bladder first side and said bladder second side being symmetrical about a bladder longitudinal axis.

6. The seat of claim 5 wherein said bladder further comprises a depression, said depression open to said bladder first side and said bladder second side, and having a fitting that depends from said depression, said fitting being generally at said bladder longitudinal axis.

7. A seat comprising:
a seat top;
a seat bottom;

a seat front;
a seat rear;
a seat first side;
a seat second side; and
a bladder, said bladder having:
    a bladder first side section and a bladder second side section;
    at least one pass; and
    a seat longitudinal axis wherein said seat is generally symmetrical about said seat longitudinal axis; and
    said bladder is selectably inflatable; and
a cover, said cover having a cover top with a plurality of cover top holes there through, wherein:
one of said bladder first side section and said bladder second side section is pressed against said cover when the other of said bladder first side section and said bladder second side section forms a partial separation from said cover.

8. The seat of claim 7 further comprising a rear crossover at said seat rear, said rear crossover spanning between said bladder first side section and said bladder second side section.

9. The seat of claim 8 wherein said bladder has a valley in front of said rear crossover.

10. The seat of claim 9 further comprising a front crossover spanning between said bladder first side section and said bladder second side section.

11. The seat of claim 7 further comprising a plate, said plate having a plate hole that is generally aligned with said at least one pass.

12. A seat comprising:
a seat top;
a seat bottom;
a seat front;
a seat rear;
a seat first side;
a seat second side;
a plate having a plate screw hole, and
a bladder supported by said plate, said bladder having:
    a bladder first side section and a bladder second side section;
    at least one pass; and
    at least one web at said seat front, said at least one web having a web screw hole that is aligned with said plate screw hole;
    a bladder longitudinal axis wherein said seat is generally symmetrical about said bladder longitudinal axis; and
    said bladder is selectably inflatable,
wherein said bladder comprises a valley between said bladder first side section and said bladder second side section, said valley extending all the way to said seat front.

13. The seat of claim 12 wherein said bladder further comprises a rear crossover, said rear crossover spanning between said first bladder side section and said second bladder side section, and said valley terminates at said rear crossover.

14. The seat of claim 12 wherein said bladder comprises two webs and two passes.

15. The seat of claim 14 wherein said plate has two holes, each of said two holes being generally aligned with a respective one of said passes of said bladder when said web screw hole and said plate screw hole are aligned.

16. The seat of claim 12 further comprising a cover, said cover having a cover top with a plurality of cover top holes there through, wherein one of said bladder first side section and said bladder second side section is pressed against said cover when the other of said bladder first side section and said bladder second side section forms a partial separation from said cover.

17. A seat comprising:
a seat top;
a seat bottom;
a seat front;
a seat rear;
a seat first side;
a seat second side;
a bladder, said bladder having:
    a bladder first side section and a bladder second side section;
    a crossover at said rear of said seat, said crossover spanning between said bladder first side section and said bladder second side section;
    a first pass;
    a second pass; and
    a seat longitudinal axis; and
a cover, said cover having a cover top with a plurality of cover top holes there through,
wherein:
    said first pass and said second pass each pass through said bladder,
    said seat is generally symmetrical about said seat longitudinal axis;
    said bladder is selectably inflatable; and
    one of said bladder first side section and said bladder second side section is pressed against said cover when the other of said bladder first side section and said bladder second side section forms a partial separation from said cover.

18. A seat comprising:
a plate;
a bladder supported by said plate wherein said bladder comprises a bladder first side and a bladder second side, said bladder first side and said bladder second side being symmetrical about a bladder longitudinal axis, and wherein said bladder further comprises a depression, said depression being open to said bladder first side and said bladder second side, and having a fitting that depends from said depression, said fitting being generally at said bladder longitudinal axis;
a cover, said cover covering said bladder and said plate;
a line; and
a pump connected to said line, said pump comprising a pump body, a plunger, a main valve and a release valve.

* * * * *